(12) United States Patent
Lozornio

(10) Patent No.: US 11,406,142 B1
(45) Date of Patent: Aug. 9, 2022

(54) LOCKING SYSTEM FOR A KNEE PAD

(71) Applicant: Marco Antonio Lozornio, Laguna Woods, CA (US)

(72) Inventor: Marco Antonio Lozornio, Laguna Woods, CA (US)

( * ) Notice: Subject to any disclaimer, the term of this patent is extended or adjusted under 35 U.S.C. 154(b) by 0 days.

(21) Appl. No.: 16/379,788

(22) Filed: Apr. 9, 2019

Related U.S. Application Data

(60) Provisional application No. 62/654,530, filed on Apr. 9, 2018.

(51) Int. Cl.
*A41D 13/06* (2006.01)
*A41D 13/00* (2006.01)

(52) U.S. Cl.
CPC ....... *A41D 13/065* (2013.01); *A41D 13/0002* (2013.01); *A41D 2300/326* (2013.01)

(58) Field of Classification Search
CPC .............. A41D 13/065; A41D 13/0002; A41D 2300/326
See application file for complete search history.

(56) References Cited

U.S. PATENT DOCUMENTS

| | | | | |
|---|---|---|---|---|
| 5,784,763 A | * | 7/1998 | Cassidy | F16G 11/14 24/129 B |
| 2008/0195013 A1 | * | 8/2008 | Ingimundarson | A61F 5/01 602/26 |
| 2010/0160957 A1 | * | 6/2010 | Kirkham | F16G 11/14 606/203 |
| 2014/0007389 A1 | * | 1/2014 | Leung | B60P 7/0823 24/68 CD |
| 2018/0132549 A1 | * | 5/2018 | Pratson | A41D 13/065 |

* cited by examiner

*Primary Examiner* — Sally Haden
*Assistant Examiner* — Erick I Lopez

(57) ABSTRACT

A left knee pad with a locking work piece having a knee pad body for the support of a protective surface having a locking workpiece with a first pair of opposing channels attached to the left side of the body, comprising a first channel and a second channel, and an attachment tab region coupled to the right side of the knee pad body. A tab having an eyelet. An elastomeric tube first portion passing thru the eyelet, the first portion is folded back around the eyelet clamped to a first portion of the cord. The tube is passed around the leg of the wearer, drawn into tension by the wearer. The tension portion of the cord is then compressed and passed into the first channel and then drawn into tension and compressed and passed into the second channel to lock the tube and knee pad to the wearer.

17 Claims, 8 Drawing Sheets

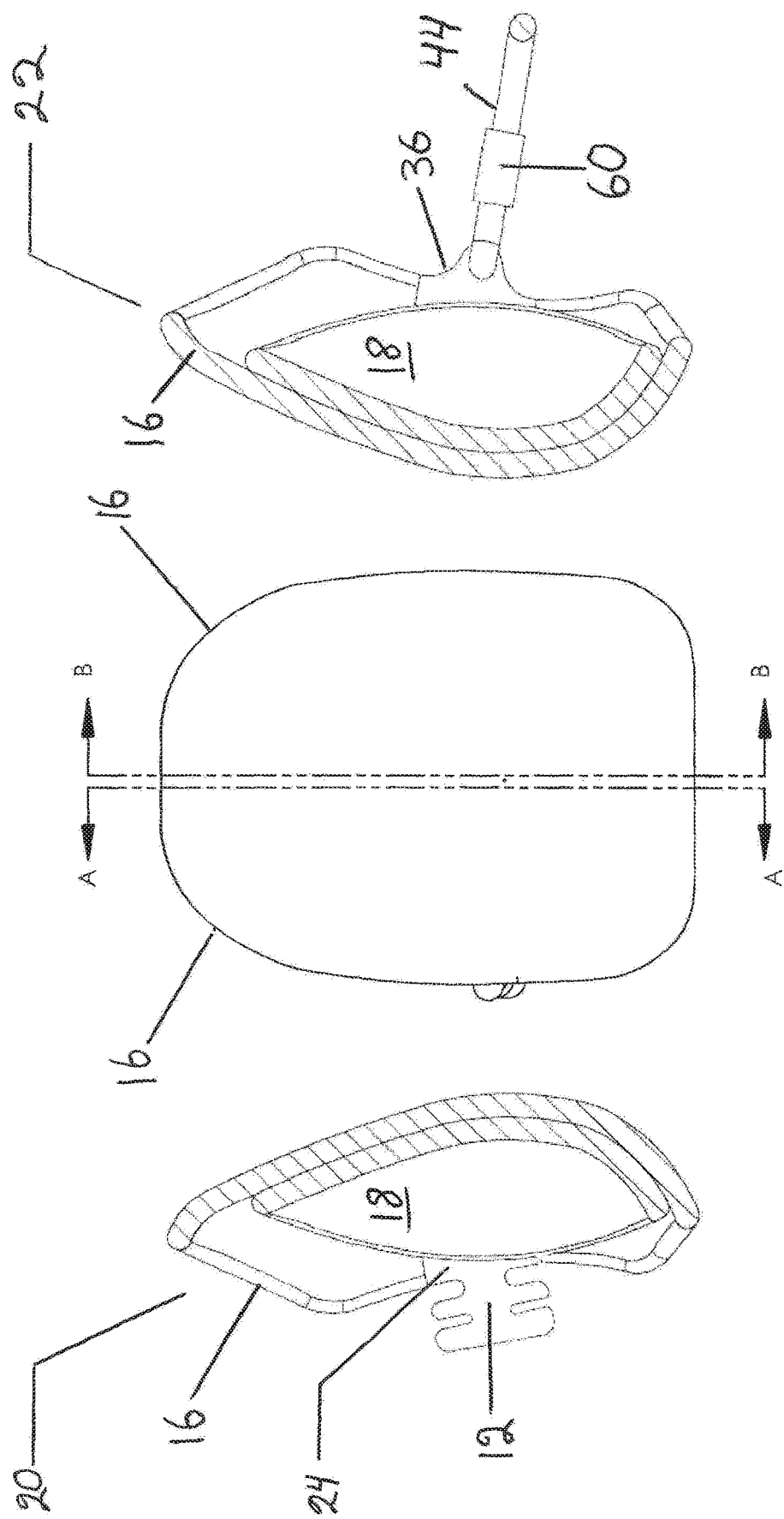

LOCKING SYSTEM FOR A KNEE PAD

This invention claims priority from U.S. Provisional Application Ser. 62/654,530 filed Apr. 9, 2018 for a LOCKING WORK PIECE SYSTEM having a sole inventor MARCO ANTINO LOZORINO. This application incorporates by reference in its entirety the contents of Ser. 62/654, 530 filed on Apr. 9, 2018 and the contents of 16365552 for a Locking work piece System filed Mar. 26, 2019. No Government funds, material or time was used in making this invention

FIELD OF INVENTION

This invention relates to the field of protection equipment worn by construction workers, and more particularly by workmen who are required to kneel regularly on rough or irregular surfaces. Such surfaces include flooring, carpeting, tile, concrete or gravel flooring. The protection equipment is required for workman that are required to be on his/or her knees while manipulating and positioning the flooring material. Such work and material can be located indoor or outdoor on dry or wet surfaces including wet soil, ice, or snow covered soil.

BACKGROUND

A workman typically dawns a knee pad that is held in place on his leg positioned to cover his knee with the use of a belt that wraps around the wearers leg. The belt that is used normally extends from one edge of the knee pad around and behind the knee and is captured and secured with a coupling means such as a matching buckle, a Velcro coupling, or a knot if rope or a line is used.

Each of the foregoing methods has one or more disadvantages. When a wearer bends and positions his knee pad on a floor, there is a tendency for the coupling means to tighten. The coupling means tends to restrict blood food in the leg of the wearer.

SUMMARY OF THE INVENTION

The invention claimed provides a for use indoors or outdoors by a workman with the need to work on their knees for long periods and who choose to use a knee pad that is easy to put on, adjust and that will not require frequent position readjustment. The claimed product has a locking work piece formed from a plate and has a region that has at least a first and second channel formed on a common central axis. An auxiliary plate is coupled to the opposite side of the knee pad. A first end of an elastomer cord is clamped or coupled to an eyelet in the auxiliary plate.

The elastomer cord is guided around the rear of the wearer of the knee pad and the cord is then stretched and forced to squeeze into the first channel, The cord remaining portion of the cord is then stretched again and dragged to squeeze another short length of the cord into an opposing second channel thereby positively binding the cord from retracting or releasing the cord.

It is a second object of the invention to add an additional pair of opposing channels the locking work piece. A remaining length of the cord is then stretched and forced to enter a third and fourth channel.

A third object of the invention is to provide an additional complement of a locking work piece, an auxiliary plate and an added elastomer cord operating as a separate group from the first set of identical elements. The added group of parts doubles the holding power of the parts to hold the claimed knee pad with a locking work piece securely to a lag and provide protection to a the covered knee.

A BRIEF DESCRIPTION OF THE DRAWINGS

FIG. 3 is a sectional view of the left knee the pad with a locking work piece of FIG. 1 taken on sectional line A-A, FIG. 4 is a sectional view of the left knee the pad with a locking work piece of FIG. 1 taken on sectional line B-B;

DESCRIPTION OF THE INVENTION

Figure 1:
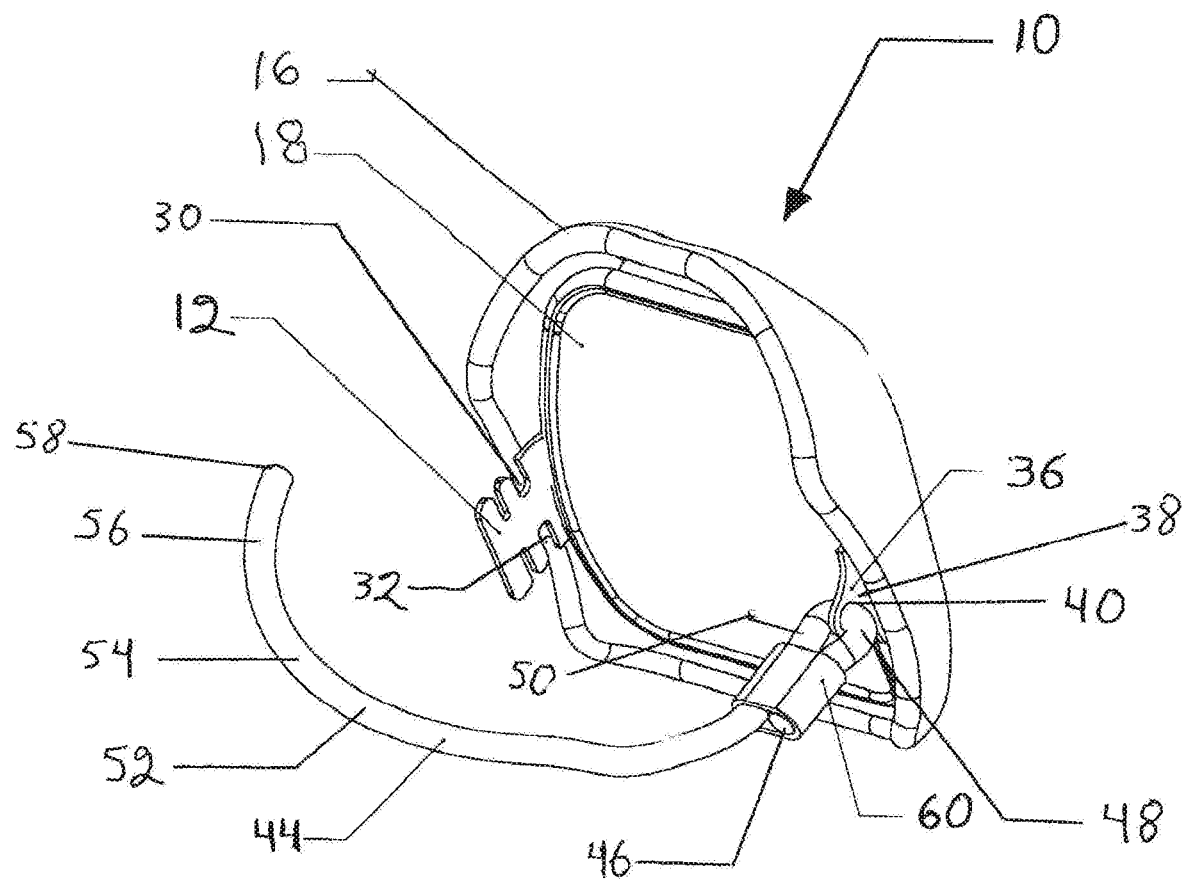
FIG. 1 is a perspective view of the rear of a left knee pad with a locking buckle
Figure 2:
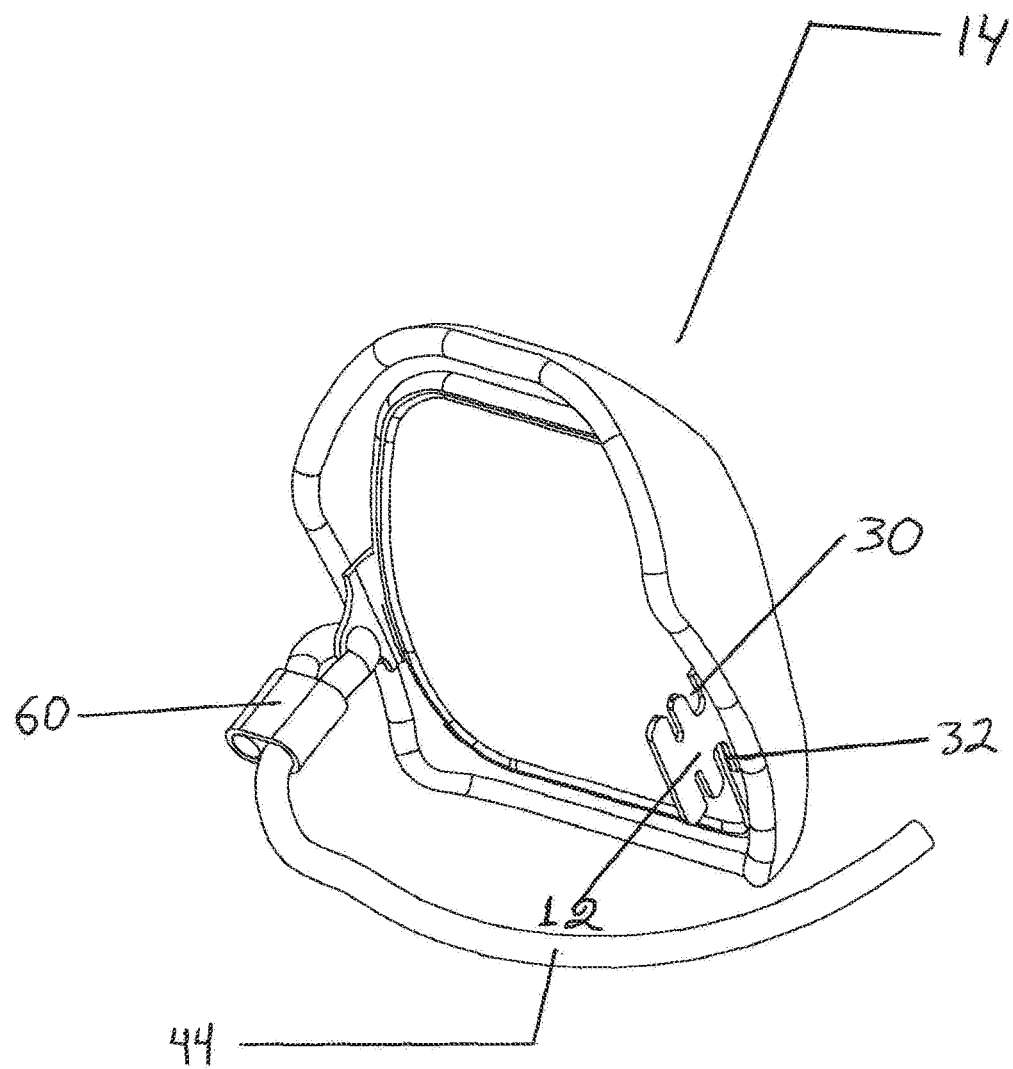
FIG. 2 is a perspective view of the rear of a right knee pad with a locking buckle

FIG. 1 show a left knee pad 10 with a locking work piece 12. The left knee pad is worn on or around the left knee of a wearer. The left knee pad is used as a pair with a right knee pad 14 that is made as a mirror image o the left knee pad 10. The knee pad body 16 appears in FIG. 1. The locking work piece 12 is coupled to a support 18 within the knee pad body 16 16. The support 18 is integrally coupled to the knee pad body 16 by bonding, molding or riveting and in an alternative embodiment, the support can be homogenously formed as a composite portion of the knee pad body 16 to provide a location for mooring and mounting the locking work piece 12 as shown in FIGS. 1, 2.

FIG. 3 schematically shows an outline of a plan view of the left knee pad with a locking work piece 10 of FIG. 1. The FIG. 3 outline is a view taken of FIG. 1 from the left and looking to the right into the page. FIG. 3 then shows a right to left section A-A view of the sectioned knee pad with a locking work piece 10 in which the locking work piece 12 appears in the distance. FIG. 4 snows an image looking from the left to the right of the knee pad with a locking work piece 10 in which the auxiliary plate 36 can be seen in the distance along with the elastomeric cord 44 and the clamp 46.

The sectional views of FIGS. 3 and 4 show support 18 providing structural rigidity within the protective surface 18. The knee pad body 16 has a left side 20 and a right side 22. The locking workpiece 12 has an attachment tab region 24 that is show in FIG. 3 coupled to the knee pad body left side 20.

Figure 5:
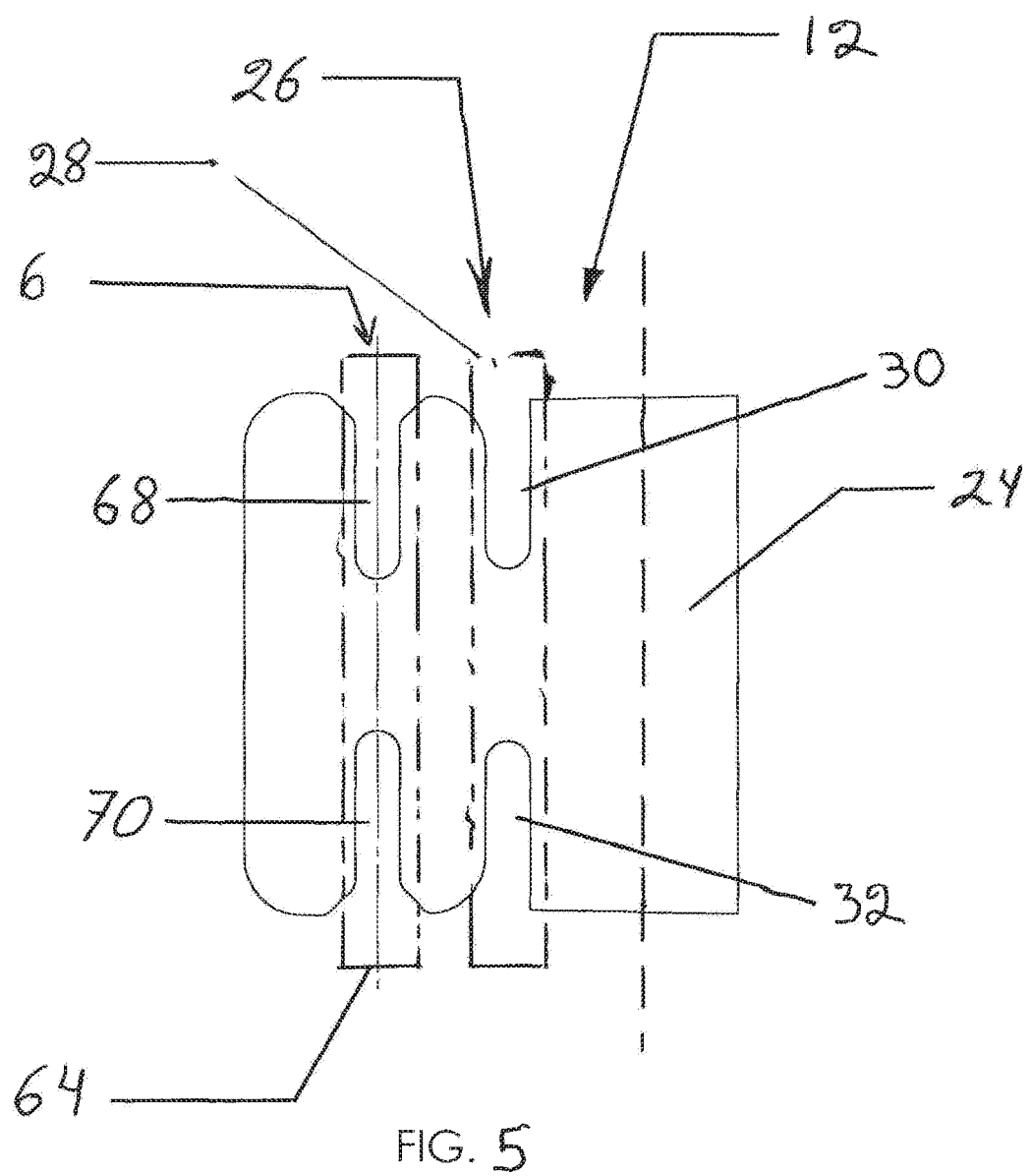
FIG. 5 is a plan view of the locking work piece workpiece.

FIG. 5 schematically shows the locking work piece 12 in a plan view. As illustrated, the locking work piece 12 has an opposing channel region 26 within phantom box 28 having a first pair of opposing channels 30, 32 that form first channel 30 and a second channel 32. The attachment tab region 24 is coupled to the left side of the knee pad body 16 and support 18.

Figure 6:
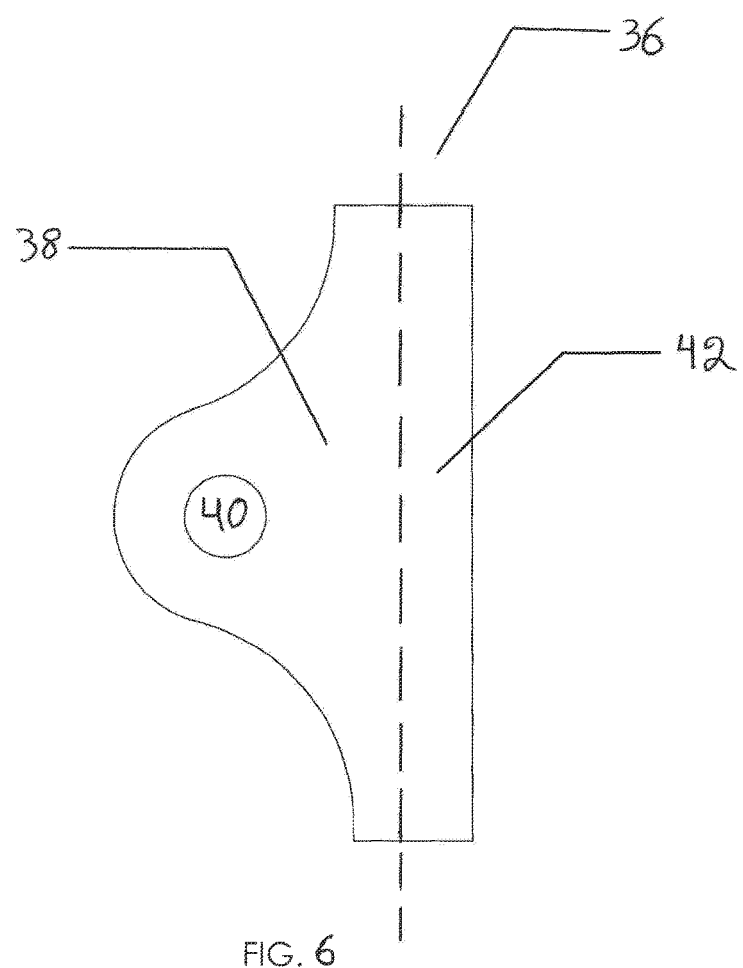
FIG. 6 is a plan view of the auxiliary plate showing the eyelet.

FIG. 6 schematically shows a plan view of the auxiliary plate 36, The auxiliary plate has an eyelet region 38 with an eyelet 40. The attachment tab region 42 is coupled to the right side of the knee pad body 22.

Referring back to FIG. 1, the elastomeric cord 44 is shown having a first end 46 at the start of the elastomeric cord sequence of portions The portions comprise a first portion 48, a second portion 50, a third portion 52, a fourth compressed portion 54 and an uncompressed fifth portion 56.

The fifth portion terminates at a second end 58. The elastomeric cord first portion 48 passes thru the eyelet 40. The first portion 48 is folded back around the eyelet region 38 and positioned along side the elastomeric cord second portion 50. A clamp 60 is shown holding the first portion 48 and the second portion 50 to form a loop that engages the eyelet 40. The elastomeric cord second portion 50 is extended to wrap around the popliteal area of the wearer (not shown) i.e. (the back of the knee) of the left leg and knee, of the wearer (not shown.)

The third portion of the elastomeric cord 52 is drawn into tension by the wearer and while in the stretched condition, it is further compressed to reduce its diameter at the neck of the first opposing channel 30 and then, if necessary, further compressed and passed through the first opposing channel 30, The fourth compressed portion of the elastomeric cord 54 starts as the elastomeric cord 54 exits the first opposing channel 30 and is stretched and forced to pass through the second opposing channel 32 ending at the beginning of the fifth uncompressed portion of the elastomeric cord 56.

Figure 9:
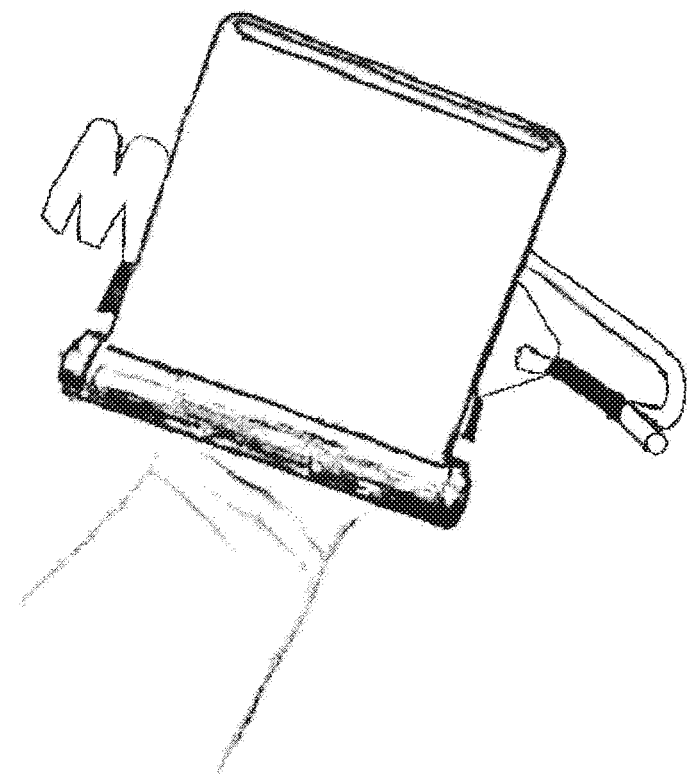
FIG. 9 is a schematic perspective view of the knee pad with a locking work piece with a platform supporting an electronic device.

The preferred embodiment of FIG. 9 shows a shows a modification the left or right knee pad body 16 that forms the inner rim into a convex shape to better receive the top or the wearer's leg when the knee pad is worn. FIG. 9 provides an arched shape surface that meets and receive the top surface of the wearer's left leg. The arc shaped or convex receiving surface is not shown. A convex receiving shape provides the knee pad body with improved stability when worn with a means for holding an electronic device on a platform secured to its outer surface.

In yet another alternative embodiment, the knee pad body has its enter outer surface formed as a plate or plane that is adapted with clips or coupling means for receiving and holding an electronic device such as a cell phone or tablet. An alternative embodiment of that type would mount above the knee above the thigh thus permitting the wearer to view the selected electronic device as the wearer is seated in the seat of a vehicle or plane.

Returning now to the embodiment of the left knee pad with locking work piece of FIG. 1, and more particularly to the sectional drawing of FIG. 3, and the plan view of FIG. 5 there is shown the locking workpiece 12 is shown a second phantom box 64 that contains a second channel opposing region.

The second channel opposing region if/FIG. 5, as shown, has a second pair of opposing channels 66 comprising a third and fourth opposing channel 68, 70. The second pair of opposing channels provides an added level of security against inadvertent release when the fifth portion of the elastomeric cord is drawn into tension, compressed and passed through the third channel, or is stretched and compressed and forced into the third and fourth channel.

Figure 7:
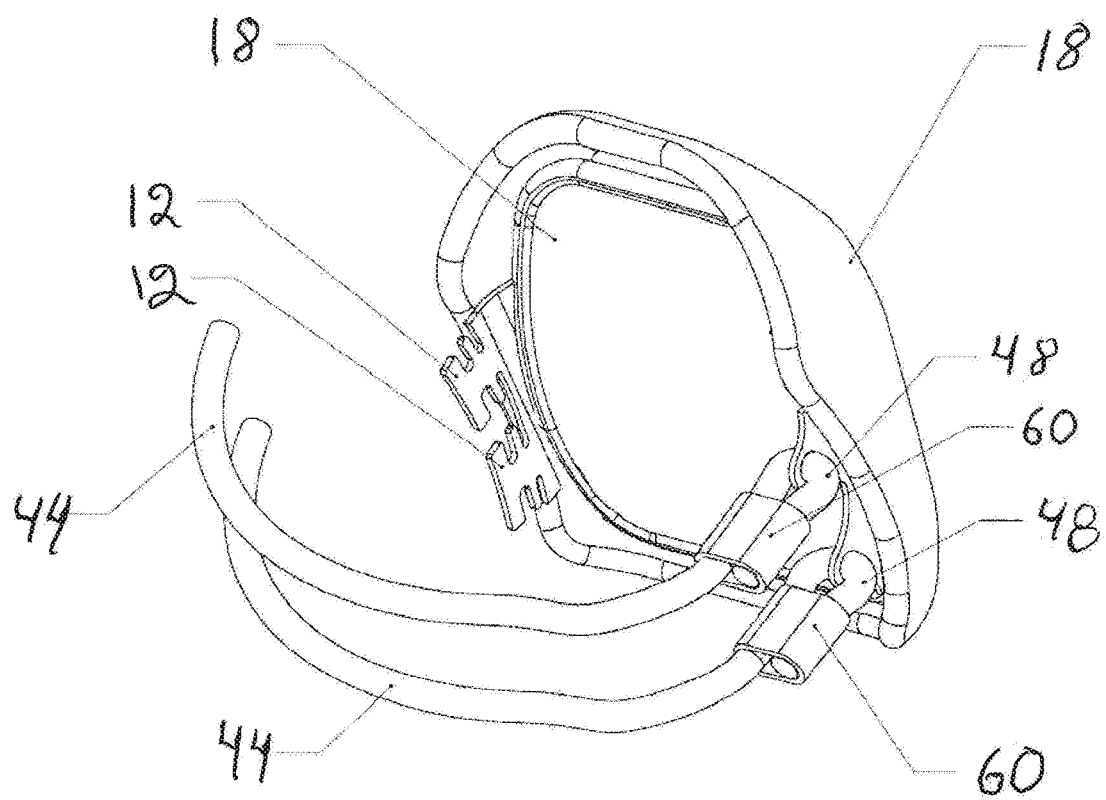
FIG. 7 is a perspective view of the rear of a left knee pad with a dual locking buckle.
Figure 8:
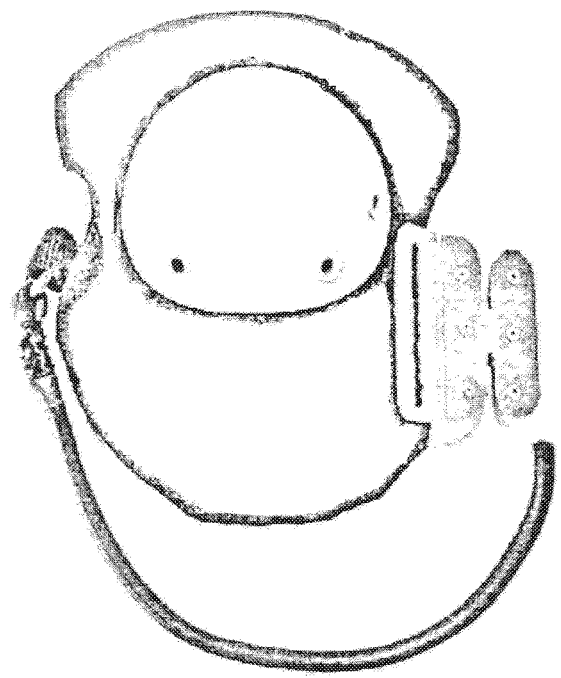
FIG. 8 is a plan view from the front of a prototype left knee pad with a locking buckle.

FIG. 7 shows a left knee pad with a locking work piece as characterized above. However, the embodiment of FIG. 7 is modified to have an added locking buckle, an added elastomer cord and an added auxiliary plate. The added locking buckle, added elastomer cord and an added auxiliary plate are all coupled to the knee pad body 16 in the same way as their equivalent primary parts, but are displaced on the rear edge of the knee pad body 16 left side 20 so as to uniformly distribute the holding force from the elastomer cords that keeps the knee pad body 16 on the knee of the wearer while providing the option of reducing the tension of the elastomer cords and improving the comfort afforded to the wearer.

In operation, the elastomeric cord of FIG. 7 is mounted with a clamp, is passed under the wearer's leg and coupled to the second locking work piece in the same manner and process that was used with the first elastomeric cord as it is coupled to the first locking work piece as explained in detail above.

FIG. 2 shows a right knee pad with a locking work piece in a schematic perspective view. The right knee pad with a locking work piece is formed as the mirror image of the left knee pad with a locking work piece explained above and except for the positioning of the parts on the left knee pad body, the parts are interchangeable. Operation and the sequence of how the parts function is the same as with that of the left knee pad with locking work piece 10 as explained above with the exception being that the right knee pad with locking work piece is secured to the wearer's right knee or thigh and the elastomeric cord depicted in FIG. 2 is wrapped around the wearer's right leg.

In an another alternative embodiment, the right knee pad 10 of FIG. 2 has its knee pad body 16 formed to provide a convex boundary or conves channel that is better suited to interface with the top of a wearer's thigh surface.

The right knee pad with a locking work piece 10 of FIG. 2 also lends itself to the incorporation of a second opposing channel region having a second pair of opposing channels that also has a third and fourth opposing channel, and wherein the fifth portion of the elastomeric cord is drawn into tension and compressed and passed through the third channel in a process equivalent to that explained above in connection with the steps used with the left knee pad with a locking work piece 10.

The right knee pad with a locking work piece of FIG. 2 also lends itself to the incorporation of a second locking work piece with an opposing channel region having a first pair of opposing channels comprising a first channel and a second channel, and an attachment tab region, coupled to the left side of the knee pad body. As all ready explained in connection. In this embodiment, the right knee pad also has a second auxiliary plate with an eyelet region with an eyelet and an attachment tab region coupled to the right side of the knee pad body.

A second elastomeric cord is provided that has first end at the start of an elastomeric cord sequence of portions, the portions comprise a first portion, a second portion, a third portion, a fourth compressed portion, and an uncompressed fifth portion. The fifth portion terminates at a second end. The elastomeric cord first portion passes thru the eyelet, is folded back around the eyelet and clamped to the second portion, In this embodiment as in those above, the elastomeric cord second portion is extended to wrap the back of the knee of the left leg and knee, of the wearer, The third portion of the elastomeric cord is drawn into tension by the wearer and then compressed and passed through the first opposing channel. The fourth compressed portion of the elastomeric cord starts after exiting the first opposing channel and is then stretched and forced to pass through the second opposing channel ending at the beginning of the uncompressed fifth portion.

The FIG. 9 version of the left knee pad with a locking work piece is formed to provide a platform and it uses an elastomeric cord as is used by the other embodiments explained above. The elastomeric cord used in all versions is similar to the cord sold by the There Band company of 124

South Home Ave. Akron, Ohio 4431 having phone number 330 633 8460 or 800 321 2135. A preferred tube has an outside diameter in the range of 5/16 to 3/8 inches depending on the application. The tubing for best results has a wall thickness and a and an empty circular cavity with a diameter equal to approximately half the outside diameter. The tube material selected has a durometer value in the range of from 15 to 25. The diameter of the opening in the tube is approximately half of the outside diameter of the tube. The diameter, durometer and finish of the material selected will typically be determined by the application, and the range of materials available for select form.

In each of the embodiments above, the function of the knee pad is the protection of the knee of the wearer. In view of the many rough surfaces that can be encountered, the knee pad body 20 must be of a material selected to provide the desired protection and durability that is desired by the buyer. In addition to the addition of a platform to the knee pad body 20 for the support of an electronic device, the body can also be modified to provide a mounting surface for a pad of material selected for its durability and protective ability or if desired, a cushion feature if desired by the buyer.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C and N, the text should be interpreted as requiring only one element from the group, not A plus N, or B plus N, etc.

What is claimed is:

1. A locking system for a knee pad, the locking system comprising:
   a first plate connectable to a first side of a knee pad;
   a second plate connectable to a second side of the knee pad, the second plate comprising a first channel and a second channel, the first channel having a channel opening on a first side of the second plate, the second channel having a channel opening at an opposite side of the second plate; and
   an elastomer cord having a first end and a second end, the first end coupled to the first plate, the elastomeric cord having a first cross-sectional dimension when in an unstretched condition,
   wherein the first channel has a width that is less than the first cross-sectional dimension of the elastomer cord, wherein the elastomer cord may be guided around the rear of the knee of a wearer of the knee pad so that the second end can be connected to the second plate by stretching the elastomer cord to reduce the cross-sectional dimension of the elastomer cord to a size smaller than the width of the first channel, inserted into the first channel, and unstretched so that the elastomer cord is retained within the first channel,
   wherein the second channel has a width that is less than the first cross-sectional dimension of the elastomer cord, wherein the second end of the elastomer cord that is retained within the first channel can be further stretched to reduce the cross-sectional dimension of the elastomer cord to a size smaller than the width of the second channel, inserted into the second channel, and unstretched so that the elastomer cord is retained within the second channel, and
   wherein the elastomer cord is adapted to be stretched from the first plate, around the back of the knee of a wearer and attached directly to the second plate to secure the knee pad over the knee of the wearer.

2. A locking system according to claim 1 wherein the elastomer cord has a round cross-section.

3. A locking system according to claim 1 wherein the elastomer cord has a circular cross-section.

4. A locking system according to claim 1 wherein the first plate and the second plate are connected to a knee pad support.

5. A locking system according to claim 1 wherein the first plate and the second plate are connected to a knee pad support by bonding, molding, riveting, or by being homogenously formed as a portion of the knee pad support.

6. A locking system according to claim 1 wherein the first channel and the second channel are opposing channels.

7. A locking system according to claim 1 wherein the first end of the elastomer cord is coupled to the first plate through an eyelet in the first plate.

8. A locking system according to claim 1 wherein the second plate further comprises a third channel and a fourth channel.

9. A locking system according to claim 1 wherein the second plate further comprises a third channel and a fourth channel, the fourth channel opposing the third channel.

10. A knee pad comprising:
    a knee pad support;
    a knee pad body couplable to the knee pad support;
    a locking system comprising:
       a first plate connected to a first side of the knee pad support;
       a second plate connected to a second side of the knee pad support, the second plate comprising a first channel and a second channel, the first channel having a channel opening on a first side of the second plate, the second channel having a channel opening at an opposite side of the second plate; and
       an elastomer cord having a first end and a second end, the first end coupled to the first plate, the elastomeric cord having a first cross-sectional dimension when in an unstretched condition,
       wherein the first channel has a width that is less than the first cross-sectional dimension of the elastomer cord, wherein the elastomer cord may be guided around the rear of the knee of a wearer of the knee pad so that the second end can be connected to the second plate by stretching the elastomer cord to reduce the cross-sectional dimension of the elastomer cord to a size smaller than the width of the first channel, inserted into the first channel, and unstretched so that the elastomer cord is retained within the first channel, and
       wherein the second channel has a width that is less than the first cross-sectional dimension of the elastomer cord, wherein the second end of the elastomer cord that is retained within the first channel can be further stretched to reduce the cross-sectional dimension of the elastomer cord to a size smaller than the width of the second channel, inserted into the second channel, and unstretched so that the elastomer cord is retained within the second channel.

11. A knee pad according to claim 10 wherein the elastomer cord has a round cross-section.

12. A knee pad according to claim 10 wherein the elastomer cord has a circular cross-section.

13. A knee pad according to claim 10 wherein the knee pad is a left knee pad and further comprising a second knee pad.

14. A knee pad according to claim 10 wherein the first plate and the second plate are connected to the knee pad support by bonding, molding, riveting, or by being homogenously formed as a portion of the knee pad support.

15. A knee pad according to claim 10 wherein the first channel and the second channel are opposing channels.

16. A locking system according to claim 10 wherein the second plate further comprises a third channel and a fourth channel, the fourth channel opposing the third channel.

17. A method of attaching a knee pad to the knee of a wearer, the method comprising:
   providing a locking system comprising:
      a first plate connectable to a first side of a knee pad;
      a second plate connectable to a second side of the knee pad, the second plate comprising a first channel and a second channel, the first channel having a channel opening on a first side of the second plate, the second channel having a channel opening at an opposite side of the second plate; and
      an elastomer cord having a first end and a second end, the first end coupled to the first plate, the elastomeric cord having a first cross-sectional dimension when in an unstretched condition,
      wherein the first channel has a width that is less than the first cross-sectional dimension of the elastomer cord and wherein the second channel has a width that is less than the first cross-sectional dimension of the elastomer cord;
   positioning the knee pad at the wearers knee;
   guiding the elastomer cord around the rear of the knee of a wearer of the knee pad so that the second end can be connected to the second plate; and
   connecting the second end of the elastomer cord to the second plate by:
      stretching the elastomer cord to reduce the cross-sectional dimension of the elastomer cord to a size smaller than the width of the first channel;
      inserting the second end of the elastomer cord into the first channel;
      unstretching the elastomer cord so that the elastomer cord is retained within the first channel;
      again stretching the elastomer cord to reduce the cross-sectional dimension of the elastomer cord to a size smaller than the width of the second channel;
      inserted the elastomer cord into the second channel; and
      unstretching the elastomer cord so that the elastomer cord is retained within the second channel.

* * * * *